United States Patent [19]

Hammond et al.

[11] Patent Number: 4,729,152

[45] Date of Patent: Mar. 8, 1988

[54] APPARATUS AND METHOD FOR ASSEMBLING ELECTRICAL HARNESSES

[75] Inventors: Michael B. Hammond, Chestnut; Clive Gaskell, Fleet, both of England

[73] Assignee: Molex Incorporated, Lisle, Ill.

[21] Appl. No.: 787,357

[22] Filed: Oct. 15, 1985

[30] Foreign Application Priority Data

Nov. 22, 1984 [GB] United Kingdom ................. 8429512

[51] Int. Cl.[4] ........................ H01R 43/00; B23P 19/00

[52] U.S. Cl. .................................... 29/33 M; 29/749; 29/564.3; 29/564.6; 29/857

[58] Field of Search .................... 29/749, 564.1, 564.3, 29/564.6, 566.3, 33 M, 857, 861, 863, 865; 198/468.9, 620

[56] References Cited

U.S. PATENT DOCUMENTS

| | | | |
|---|---|---|---|
| 2,903,120 | 9/1959 | Thomas | 198/465.2 |
| 2,999,579 | 9/1961 | Kostrzewa | 198/795 |
| 4,110,880 | 9/1978 | Peppler et al. | 29/749 |
| 4,136,440 | 1/1979 | Brandewie et al. | 29/749 |
| 4,372,041 | 2/1983 | Winkelman | 29/564.6 |
| 4,419,817 | 12/1983 | Funcik et al. | 29/749 |
| 4,492,023 | 1/1985 | Schneider et al. | 29/749 |

*Primary Examiner*—Z. R. Bilinsky
*Assistant Examiner*—A. Dougas
*Attorney, Agent, or Firm*—John W. Cornell; Louis A. Hecht

[57] ABSTRACT

Disclosed is an electrical cable harness making apparatus including a shuttle table system for moving a connector between loading and termination stations. The shuttle table system includes a plurality of coplanar tables moveable in a common closed rectilinear path.

Also disclosed is an arrangement for removing integrally molded tabs which join a plurality of housings together at spaced predetermined distances from each other. The arrangement includes a plurality of punches aligned with the connecting tabs and mounted for selective movement between operative and inoperative positions. A cover overlying the punches maintains groups of punches in their respective operative and inoperative positions.

Also disclosed for use with the above apparatus is an arrangement of wire guides which pay out predetermined lengths of cable from a supply source and, after cutting the cable free of the source, provide transport thereof to a termination station.

14 Claims, 20 Drawing Figures

APPARATUS AND METHOD FOR ASSEMBLING ELECTRICAL HARNESSES

BACKGROUND OF THE INVENTION

1. Field of the Invention

The present invention relates to an apparatus for assembling terminated wires into electrical connectors to form harnesses.

2. Brief Description of the Prior Art

In order to conduct electrical signals between printed circuit board assemblies or components by means of electrical conductors in electrically operated equipment and products, it is common to employ a harness of terminated wires assembled into a single connector at at least one end, the wires being also terminated at their other ends.

The object of the present invention is to provide an improved apparatus and method for the semi-automatic or automatic manufacture of such harnesses.

Another object of the present invention is to provide apparatus of the above-described type having shuttle tables which may be moved rapidly from one station to the next, in straight lines, around a closed rectilinear path, so as to occupy very little space, with the resulting benefit that the size of the apparatus may be reduced.

Yet another object of the present invention is to provide linearly movable means for alternately loading a connector at a loading station of the apparatus and unloading a harness at an unloading station of the apparatus, the loading and unloading stations being disposed alongside one another on opposite sides of said closed, rectilinear path.

Another object of the present invention is to provide a selectively adjustable connector separation unit for separating connectors from chain molded connector sticks fed into the apparatus.

Another object of the present invention is to provide an arrangement for terminating a flat multi-conductor ribbon cable having a plurality of spaced-apart electrical conductors with a common insulating covering forming web portions between adjacent conductors. Accordingly, an object of the present invention is to provide a single termination head including web splitting and conductor insertion means which simultaneously prepares and terminates a cable in a single operation.

Still another object of the present invention is to provide an improved arrangement for aligning a connector housing with a connector feed member which transports the connector between loading and terminating stations.

Yet another object of the present invention is to provide an improved cable presenting arrangement which is operative to pay out a cable segment of predetermined length from a supply source, sever the cable segment from the source, and transport the cable segment to a termination station.

Yet another object of the present invention is to provide improved means for removing connecting tabs formed between adjacent connectors to maintain those connectors at fixed spaced apart distances from each other.

SUMMARY OF THE INVENTION

These and other objects of the present invention are provided in an apparatus for making an electrical cable harness including a flat multi-conductor ribbon cable with a plurality of spaced-apart electrical conductors having a common insulating covering forming web portions between adjacent conductors, electrically connected to an electrical connector having a plurality of insulation displacing terminals. The apparatus includes a connector loading station whereat a connector is initially positioned, a termination station spaced from said loading station whereat a connector is terminated to the cable, means for moving the connector from said loading station to the termination station, means for presenting a cable end to the termination station so that the conductors are aligned with the terminals, and a termination head at the termination station for engaging the end of the cable and mass inserting the conductors in the terminals. The improvement in the termination head comprises an alternating sequence of conductor insertion blades and web splitting blades mounted for simultaneous movement, the conductor insertion blades aligned with conductors of the cable end, and the web splitting blades aligned with web portions of the cable, whereby upon downward movement of the termination head the conductor insertion and web splitting blades simultaneously engage the conductors and web portions, respectively, to insert the conductors into the insulation displacing terminals.

A further improvement in an apparatus of the above-described type is provided for connectors including a dielectric housing having an outside surface with engaging means predeterminedly positioned thereon. The improvement comprises a feed member moveable between a feed track and the loading station, having a plurality of complementary engaging means for mating with the housing to align the housing with respect to the feed member, and means for moving the feed member to the loading station to thereby deliver the connector to a predetermined initial position at the loading station.

Other objects of the present invention are provided in an apparatus for making a double-ended electrical cable harness including a flat multi-conductor ribbon cable having two ends, each terminated to an electrical connector having a plurality of insulation displacing terminals, the apparatus including a connector loading station whereat a connector is initially positioned, a pair of spaced-apart termination stations, remote from the loading station, whereat a connector is terminated to the cable, means for moving a connector from the loading station to each of the termination stations, and means for presenting the respective ends of a predetermined length of cable to the termination stations, including means for feeding a predetermined length of cable from a cable supply, means for severing the predetermined length from the cable supply, and means for presenting respective ends of the cable length to each of the termination stations. The improvement in the cable presenting means comprising a pair of presenting wire guides moveable from initial positions to extended positions between the termination stations, a carriage wire guide located at an initial position beside the pair of presenting wire guides, operative to engage a free end of a cable from the cable supply and to travel from the initial position past the first presenting wire guide to a point between the presenting wire guides, to thereby feed the cable free end through the second presenting wire guide for gripping engagement therewith, a termination head mounted for reciprocal movement at the termination station for engaging a cable end and mass inserting the conductors in the terminals, cable cutting means disposed between the carriage wire guide and the first presenting wire guide, operative to sever the cable from the cable supply to define the predetermined length, and actuating means for moving the presenting wire guides to the extended positions to simultaneously present free ends of the cable lengths to the termination stations, whereby each end of the cable conductors are aligned with terminals of a connector, at a point adjacent the termination head.

A further improvement in the apparatus described immediately above is provided in connector moving means which comprise a shuttle table system including a plurality of coplanar tables movable in a common closed rectilinear path between said connector loading and terminating stations, at least one table having connector carrying means thereon.

Still other objects of the present invention are provided in an apparatus for making an electrical cable harness including a flat multi-conductor ribbon cable with a plurality of spaced-apart electrical conductors having a common insulating covering forming web portions between adjacent conductors, electrically connected to an electrical connector defined by a housing having a plurality of insulation displacing terminals loaded therein, the apparatus including a connector loading station whereat a set of connectors is initially positioned, the set including a plurality of housings spaced predetermined distances from each other and joined together by connecting tabs, a termination station spaced from the loading station whereat a connector is terminated to the cable, means for moving the connector from the loading station to the termination station, means for presenting a cable end to the termination station so that the conductors are aligned with the terminals, a termination head at the termination station for engaging the end of the cable and mass inserting the conductors in said terminals, and tab removing means operatively associated with said tabs after conductor insertion for removing said connecting tabs so as to separate said set of connectors into a plurality of independent harnesses.

The improvement in the tab removing means comprising a base member moveable toward the set of connectors, a plurality of punches mounted on the base and aligned with the connecting tabs, selectively moveable between an operative position for contacting the tab portions, and a second inoperative retracted position, and a cover overlying the punches and engaging the base member, having engaging the punches for maintaining first and second predetermined sets of punches in the operative and the inoperative positions, respectively.

DETAILED DESCRIPTION OF THE PREFERRED EMBODIMENT

Figure 1:
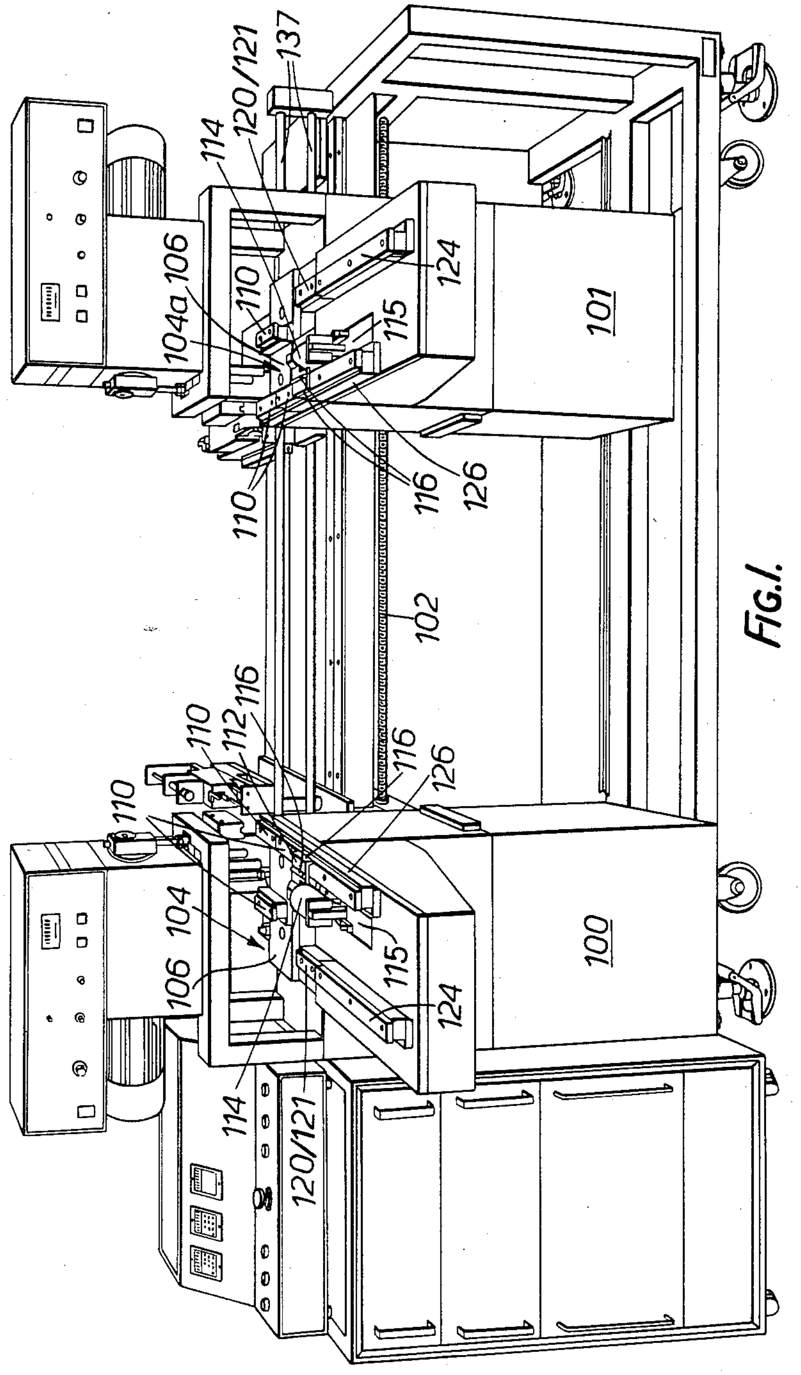
FIG. 1 shows a harness assembling apparatus according to the present invention.

With reference now to the accompanying drawings and first to FIGS. 1 to 4, the apparatus comprises left and right hand shuttle table towers, generally indicated at 100 and 101 respectively spaced apart and relatively movable towards and away from one another by means of a lead screw 102 to select the length of the harnesses to be assembled. Each tower is topped by a shuttle table system 104, 104*a* made up to three, square, shuttle tables 106 which are movable in turn, and in a following sequence, one with respect to another, as indicated by the arrows G F E H in FIGS. 2 and 4, that is to say, into successive ones of four positions around a closed, rectilinear, square-form path. The respective shuttle table systems 104, 104*a* operate in opposite directions of movement, the tables of the left hand system 104 as seen in FIGS. 1 to 4 moving clockwise, and the tables of the right hand system as seen in FIGS. 1 to 4 moving anticlockwise. Each table makes a purely linear movement in its turn, the tables moving in the directions indicated by the arrows G F E H, and each table carries a fixture 110 having a track for positioning individual connectors or a stick of sticks of interconnected connectors s, the fixtures 110 being carried by the tables with their tracks all in parallel with one another, those fixtures 110 of the left hand shuttle table system 104 being positioned each along the right hand edge of its table and those fixtures 110 of the right hand shuttle table system 104*a* being positioned each along the left hand edge of its table.

The shuttle table systems 104, 104*a* have their table fixtures 110 moved successively, in the directions indicated by arrows F into loading stations f, e.g. in which sticks of connectors are loaded into the fixture tracks, then in the directions indicated by arrows E into void positions e, then in the directions indicated by arrows H into termination stations h, in which wires w are terminated into sticks of connectors, then in the directions indicated by arrows G into test and unloading stations g in which the assembled harnesses are tested and then unloaded from the fixture tracks.

Figure 2:
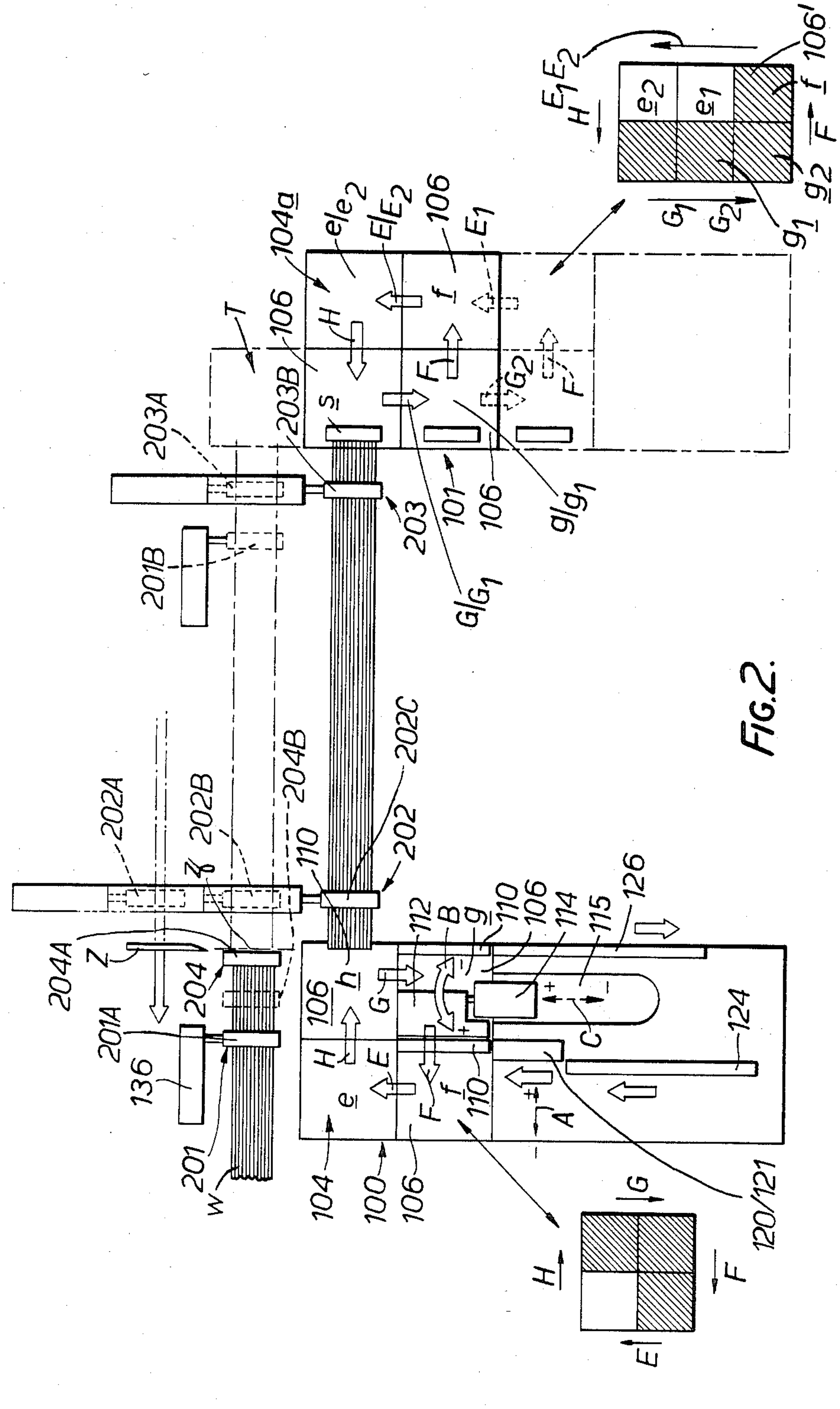
FIGS. 2 and 3 are diagrams illustrating the operation of the apparatus.
Figure 3:
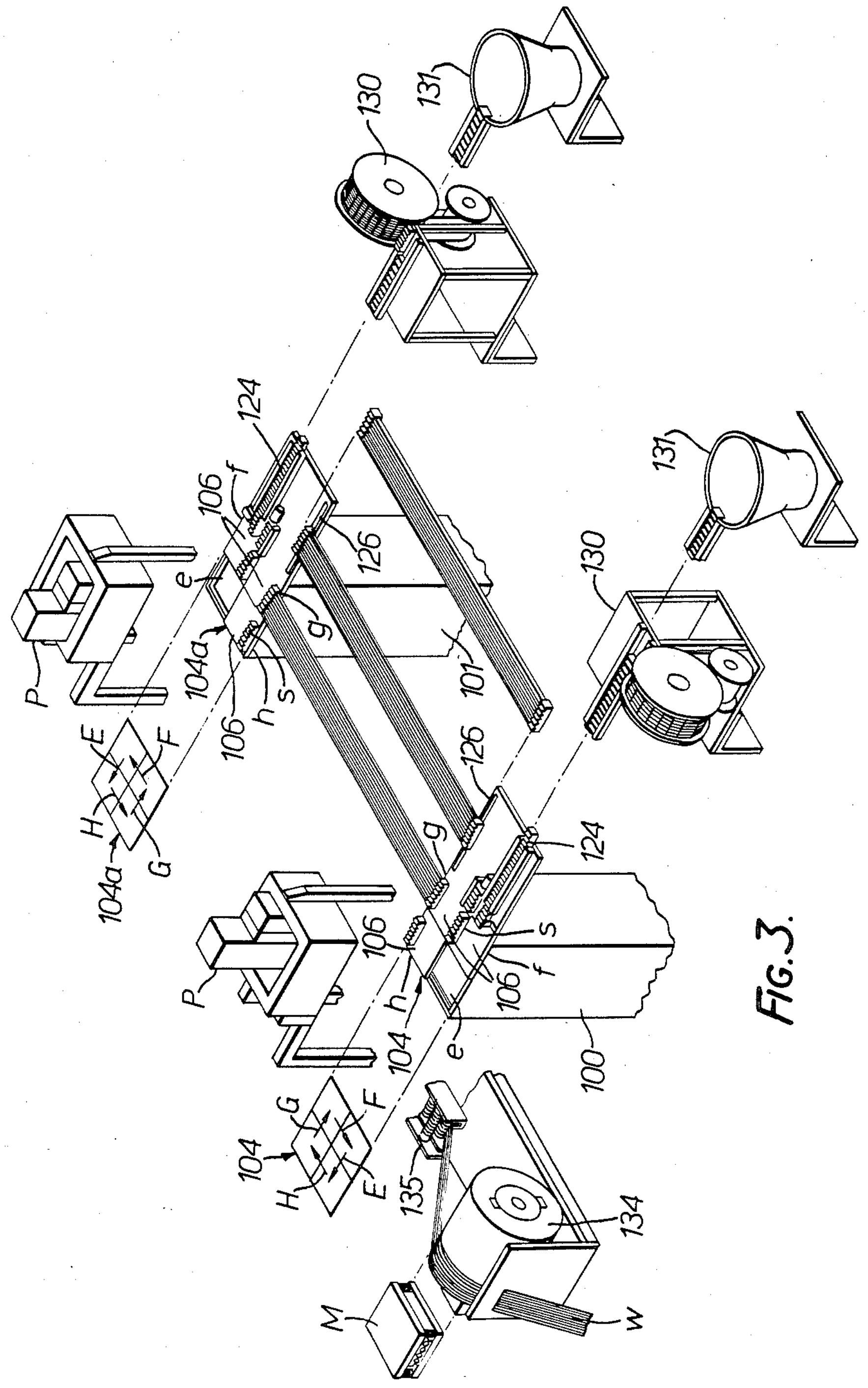
Figure 4:
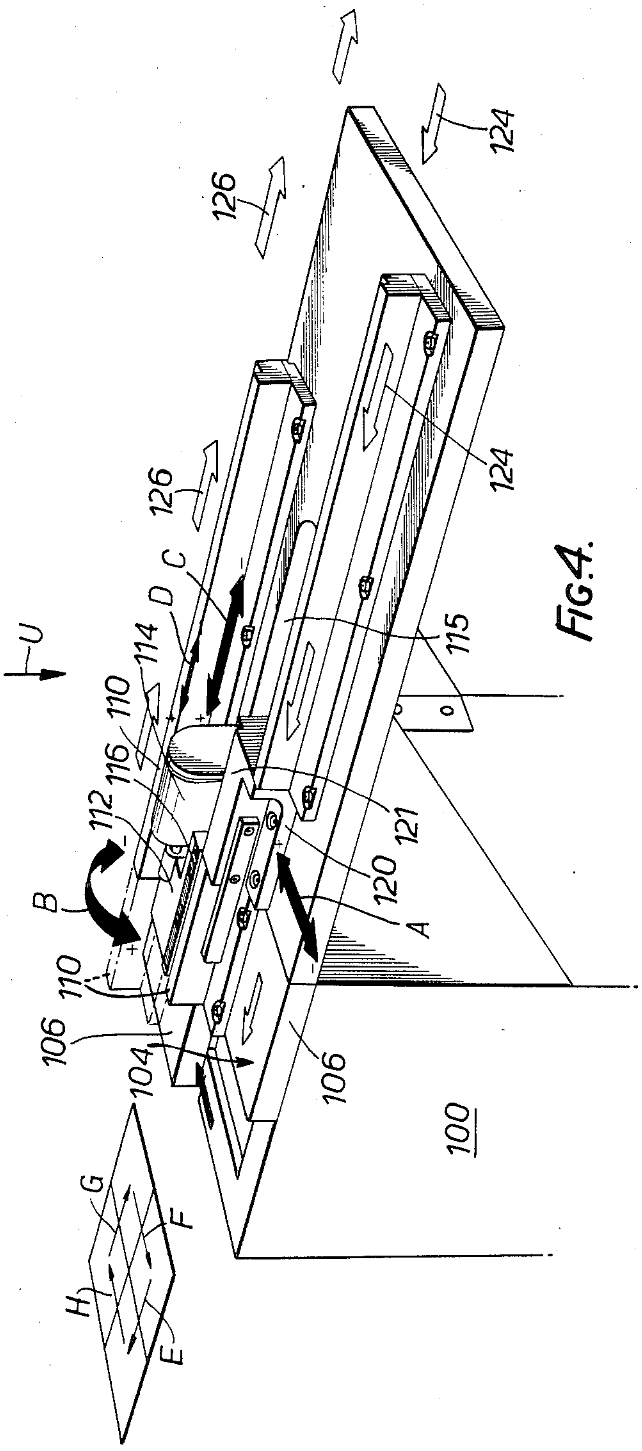
FIG. 4 is a further diagram.

Associated with each shuttle table system 104, 104*a* is a linearly movable feed/location flap 112 carried by a rotating actuator 114 mounted on a pneumatically operated slide 115 to slide to-and-from in the directions of arrows E and G and as indicated by the double-headed arrow C in FIGS. 2 and 4. The actuator 114 is actuable to position the flap 112 alternately over the loading station f and the unloading station g in which the assembled harnesses are tested and then unloaded from the fixture tracks.

Associated with each shuttle table system 104, 104*a* is a linearly movable feed/location flap 112 carried by a rotating actuator 114 mounted on a pneumatically operated slide 115 to slide to-and-fro in the directions of arrows E and G and as indicated by the double-headed arrow B. The flap 112 has a row of location teeth 116 on each side to locate in the wire receiving recesses 161 (see FIGS. 8 and 9) in connector sticks s held in the tracks of fixtures 110 positioned at the loading and unloading stations f and g respectively. The rows of teeth 116 are predeterminedly spaced to engage one tooth in each of the connector stick recesses 161, there being a recess 161 formed at each circuit point of each connector stick. The teeth 116, therefore, engage with the connector sticks s to entrain the connector sticks for loading and, thereafter, unloading movements along the fixture tracks as the actuator 114 is slid to-and-fro in the directions C+ and C− respectively, the actuator having previously been actuated to rotate the flap 112 in the directions B+ and B− respectively.

Also associated with each shuttle table system 104, 104*a* is a pre-position shuttle and component load actuator 120 which carries a track block 121 having a track for guiding sticks of connectors s parallel with the tracks of the fixtures 110 mounted on the shuttle tables. Each actuator 120 is mounted on a pneumatically operated slide so as to be slidable to-and-fro in the directions of arrows H and F as indicated by the double headed arrow A in the direction A+ to align its connector stick track respectively with that of a fixture 110 in the loading station f and in the direction A− to align its connector stick track with a connector stick loading track 124 parallel to, but outwardly offset, with respect to the fixtures 110 positioned at the loading stations f. Unloading tracks 126 are provided for the connectors s of the assembled harnesses, these aligning with the tracks of the fixtures 110 positioned at the test and unload stations g. Connectors or connector sticks s may be loaded into the loading tracks by means of a bowl feed, a tape reel feed, or by hand. Alternatively, tape feed and bowl feed mechanisms are indicated respectively at 130 and 131 in FIG. 3.

Wire feed may be from reels of discrete wires w, or ribbon cable may be used. Discrete wires w are fed in over a changeover drum 134 (see FIG. 3), for measuring the wires, the drum being selected according to the size of the wires w, and then through a wire straightener 135. The wires are fed in transversely of the loading and unloading tracks 124, 126 behind the shuttle table towers 100, 101 and are mechanically handled by wire grippers 201, 202, 203 and 204 indicated diagrammatically in FIG. 2. The carriage wire gripper 201 is carried for transverse movements, between a fixed position 201A and a selectable 201B, by a carriage 136 movable to-and-fro on track rods 137 (see FIG. 1), and this gripper moves between the jaws of the wire cutting station gripper 204 when the wire gripper 204 is open. The position 201B of the carriage wire gripper is selected depending upon the spacing of the right hand tower 101 from the left hand tower 100 and the positions 201A and 201B remain in the same position as shown in FIG. 2, relative to the towers 100, 101 respectively.

The wire gripper 204 is movable between two positions fixed relative to the tower 100, as shown in FIG. 2, relative to the towers 100, 101 respectively. The wire gripper 204 is movable between two positions fixed relative to the tower 100, as shown in FIG. 2, and in position 204A it aligns with each fixture 110 positioned at the termination station h and with the wire cutting station z. The left and right hand wire grippers 202 and 203 associated with the left and right hand towers 100, 101 respectively, are movable to-and-fro in the lengthwise direction of the loading and unloading tracks 124, 126. The gripper 202 has a rearmost position 202A out of the path of movement of the carriage 136, a second wire gripping position 202B on which it aligns transversely with the wire grippers 201 and 204 on the inboard side of the positions 201A, 204B and 204A and a third or forwardmost position 202C in which it aligns with the wire termination station h of the left hand shuttle table system 100 on the inboard side. The gripper 203 has two positions 203A and 203B which it always maintains relative to the tower 101, corresponding to the positions 202B and 202C respectively, and the grippers 202 and 203 move between their positions 202B, 203A and 202C, 203B in unison.

In the initial setting of the apparatus, the wires w are fed through the wire gripper 201 positioned at 201A and are overfed through wire gripper 204 with the gripper 204 in the position 204A, that is to say, in its position to grip the wires during the wire cutting by the wire cutter Z. The gripper 204 is not closed at this stage. Also, the left and right hand grippers 202 and 203 are open and positioned at 202A and 203A respectively. The gripper 201A is closed and the wire cutter Z is operated to cut the wires w, thereby to align the ends of the wires at the wire cutting station z.

In operation of the apparatus, the wire grippers are automatically sequenced as follows: Gripper 201 moves from 201A to 201B to transport the cut wire ends to align with the right hand termination station h. The wires are overfed through the gripper 203 which then closes. Gripper 201 then opens and moves back to 201A and recloses. At this stage, the wire ends, gripped by the gripper 203, may be operated upon by a single ended wire insulation stripper unit T. In the present example, however, it is assumed that an I.D.T. connector is being used at each end. Next, the wire gripper 202 moves to 202B and closes, gripping the wires adjacent the left hand tower 100. Next, the wire gripper 204A closes and required lengths of harness wires w are cut off from the feed wires at the station z. Next, the wire gripper 201 opens and the wire gripper 204 moves to 204B retracting the feed wire ends. Next, the wire grippers 202 and 203 move in unison to 202C and 203B respectively to position the harness wire ends at the wire insertion stations h. Termination presses P carried one over each of the shuttle table towers are then operated to terminate the wires in connector sticks s positioned at the termination stations h. Next, the wire grippers 202 and 203 open and move to positions 202A and 203A respectively. Next, the wire gripper 204 moves to 204A. Next, the carriage wire gripper 201 closes on the feed wires w at the input feed. As the same time the wire gripper 204 opens to allow the passage of the carriage wire gripper to the position 201B as the automatic wire feed cycle re-commences.

In the event that ribbon cable is used to form the harnesses, the cable may be fed through a wire measure and notching tool M. It is proposed, however, that pre-notching of the cable be dispensed with by using the slitting/insertion blade unit which is yet to be described.

Figure 5:
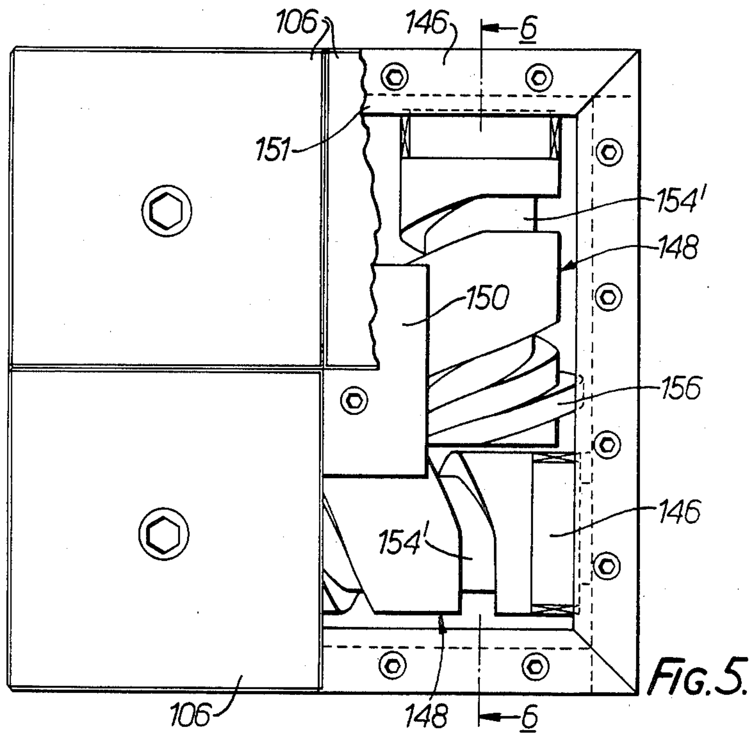
FIG. 5 is a plan view with part broken away showing one of the shuttle table systems of the apparatus.
Figure 7:
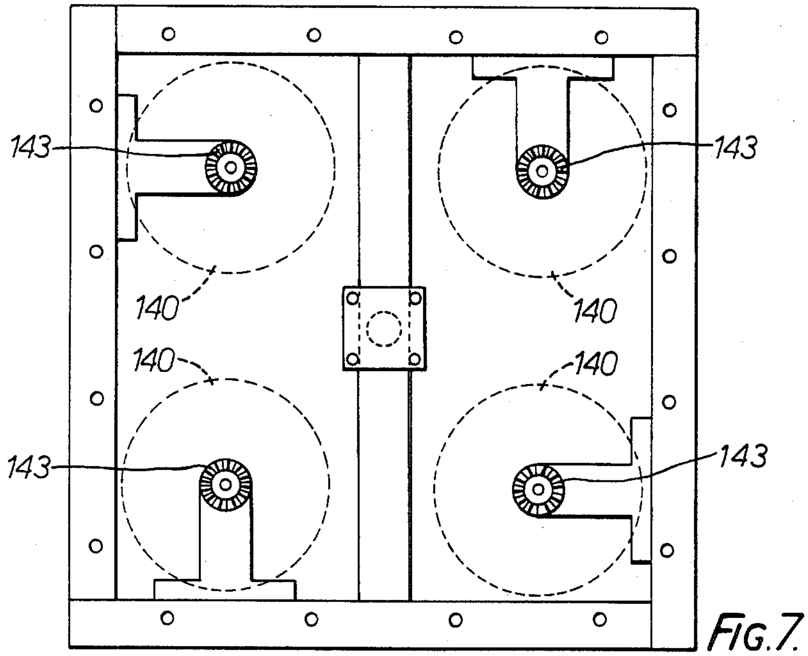
FIG. 7 is a view corresponding to FIG. 5 with certain parts removed.
Figure 6:
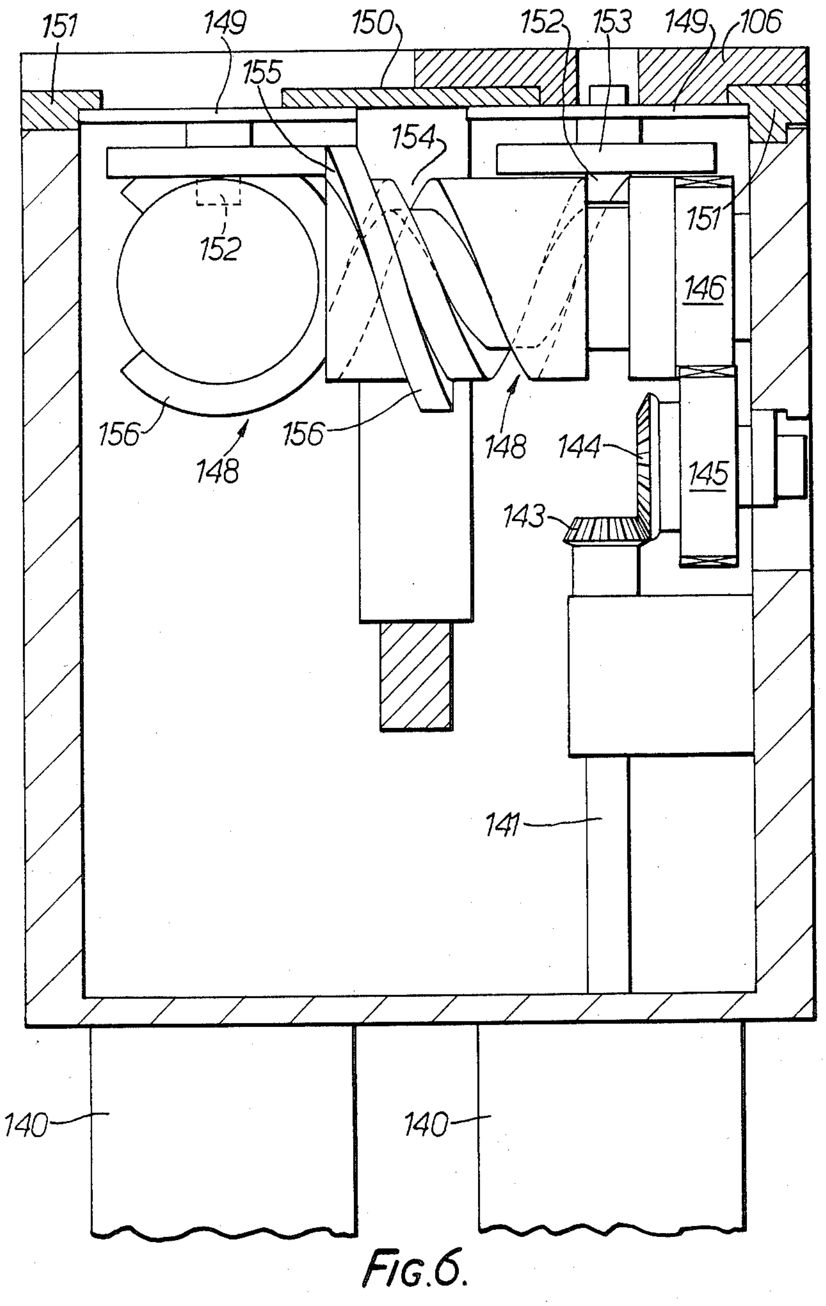
FIG. 6 is a cross-sectional elevation on line 6—6 in FIG. 5.

Referring to FIGS. 5, 6 and 7, movements of the shuttle tables 106 of each of the shuttle table systems 104, 104*a*, are accomplished using four stepper motors 140 each of which drives a shaft 141. A gear train 143, 144, 145, 146, one for each shaft 141, drives a dual track cam 148, one for each shaft. The cams 148 are positioned correspondingly, one beneath each of the shuttle table stations and each cam is operated, in turn, to shift a shuttle table to the next following station, the axes of adjacent cams 148 being disposed in the same horizontal plane at right angles to one another as seen in FIG. 5.

In a modified arrangement (not illustrated) each stepper motor 140 is repositioned and has a rubber timing belt to transmit the drive from the stepper motor shaft 141 to its associated cam 148.

In FIGS. 5 to 7, the cams are shaped and positioned to shift the tables of the left hand shuttle table tower clockwise. A reflection of the cam form and cam positions is adopted in an arrangement as shown in FIGS. 5 to 7 to shift the tables 106 of the right hand shuttle table tower anti-clockwise and will not be further described. The shuttle tables 106 each comprise a lower keeper plate 149 fixed thereto, the tables being confined to slide in their rectilinear, square-form path on inner and outer guides 150 and 151. Each table 106 carries centrally, a concentric pair of roller followers 152, 153, the smaller one 152 of which engages in helical cam grooves 154 and the larger one 153 of which engages with helical cam faces 155 on formations 156 of the cams 148. The cam faces 155 of each cam engage the follower 153 as the follower 152 leaves the cam groove 154 of the cam, to shift the follower 152 into the cam groove 154 of the next following cam 148. To accommodate this shifting, each cam groove 154 has an initial, circumferential lead-in portion 154' best seen in FIG. 5. The diameter of the followers 153 is chosen sufficient to shift the follower 152 through the full extent of this lead-in portion of the next following cam 148 so that the shuttle plate is set in its next following station for immediate onward movement when the next following cam 148 is driven in rotation by its shaft 142 and gear train 143 to 146.

In order to operate an optional six position shuttle table system as diagrammatically illustrated for the right hand shuttle tower in FIG. 2 employing four shuttle tables 106' and two void stations $e_1$, and $e_2$, the cams would be arranged in two oppositely facing, parallel pairs disposed at right angles, the pair of cams disposed along the short sides H and F of the rectilinear path of movement taking the form of the cams 148 already described and the pair of cams (not shown) disposed along the long sides G1–G2 and E1–E2 of the rectilinear paths of movement being of double length and having helical cam grooves 154 of double lengthwise extent, compared with the cams 148, and with intermediate, circumferential dwell portions corresponding with their lead-in portions 154'. This arrangement provides an additional operating station g2 (see FIG. 2) at which, for example, an overhead separation press might be provided to separate a multiple connector s in two or more connector parts and from which the separated parts would be unloaded in the manner already described. Alternatively, such a separator press might be positioned above an "off-shuttle-table station" into which connectors are unloaded, and positioned, by the actuator 114.

It will be noted that the six position shuttle table system still has its loading and unloading stations f and g2 disposed alongside one another on opposite sides of the closed rectilinear path of movement of the tables indicated by the arrows E1, E2, H, G1G2, F so that the actuator 114 can still operate alternately at these stations, as described above. The station G1 becomes simply a testing station in this case.

Figure 8:
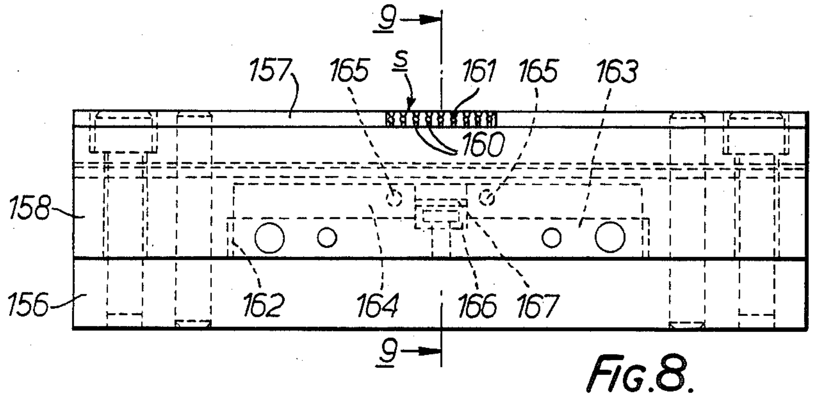
FIG. 8 is a front elevation of a shuttle plate fixture for positioning a stick of connectors and showing a part of a stick of connectors positioned in the fixture.
Figure 9:
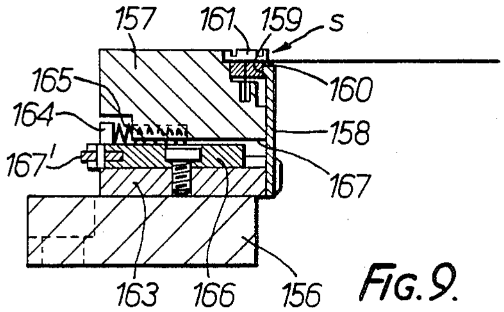
FIG. 9 is a cross-section on line 9—9 in FIG. 8 and showing the part of the connector stick.
Figure 10:
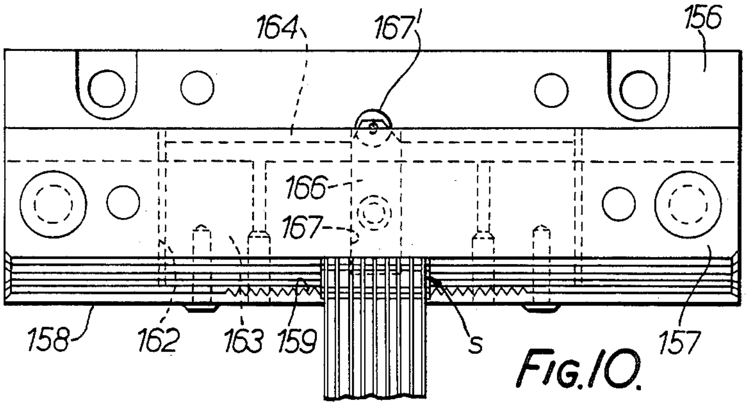
FIG. 10 is a plan view of FIG. 8, and showing the part of the connector stick.

Referring now to FIGS. 8, 9 and 10, each shuttle plate fixture 110 comprises a base plate 156, a track block 157 which, together with a location plate 158, defines a track in which sticks of connectors s may be positively located by teeth 159 on the location plate. The teeth 159 are spaced apart to interfit with grooves 160 molded in the inboard face of the connector sticks s, one such groove 160 aligning with each wire receiving recess 161 previously described. The teeth 159 are predeterminedly spaced to engage one tooth in each of the connector stick grooves 160. The track block 157 is located with respect to, and fixed to, the base plate 156 by dowels and screws and defines a central recess 162 in its lower face which houses a slide 163 which slides on the base plate and which carries the location plate 158 at one of its longitudinal edges, the slide having an abutment flange 164 at its opposite longitudinal edge which engages compression springs 165 partially housed in bores in the track block. The springs 165 urge the location plate 158 into its locating relation and the slide 163 is movable against the action of the springs 165 to displace the location plate and thereby release connector sticks s located in the fixture track, for unloading lengthwise from the track by the actuator 114 as already described, and to open the track to receive connector sticks loaded lengthwise into the track by the actuator 114, as already described. The slide fixedly mounts a transverse tenon 166 which is guided for sliding movement in a transverse groove 167 in the track block 157. The tenon carries a roller follower 167' for operating the slide in proper sequence as described below.

Figure 11:
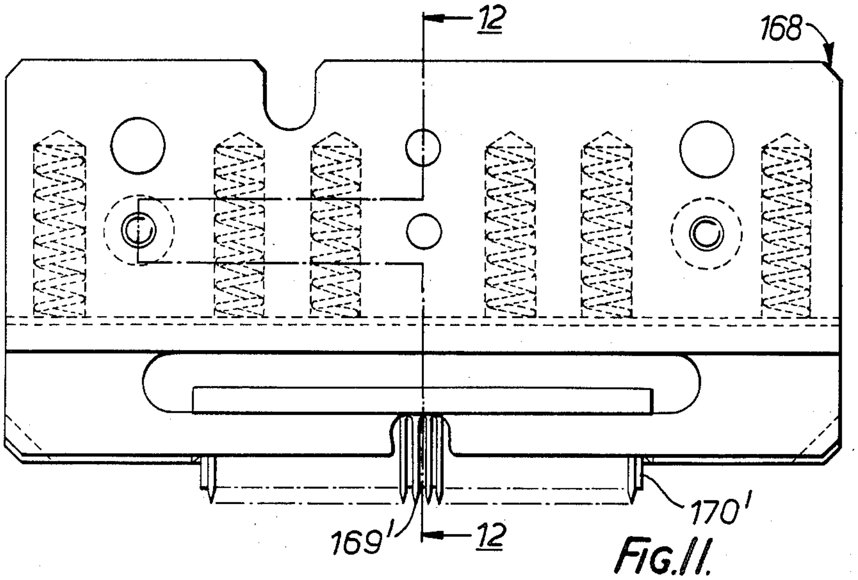
FIG. 11 is a front elevation of the slitting/insertion blade unit of the apparatus.
Figure 12:
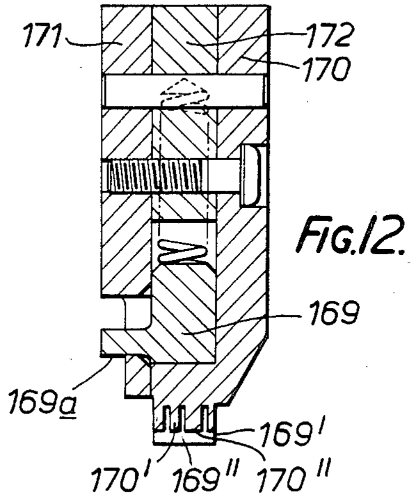
FIG. 12 is a cross-section on line 12—12 in FIG. 11.
Figure 13:
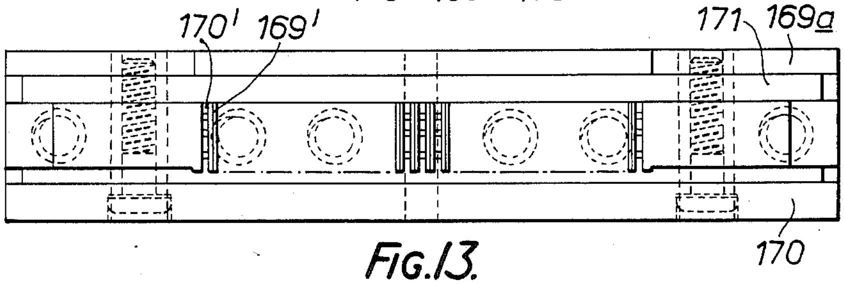
FIG. 13 is an underneath plan view in FIG. 11.

The slitting/insertion blade unit 168 shown in FIGS. 11, 12 and 13 is intended for slitting the ends of ribbon cable and inserting the separated insulation covered ends of the wires in IDT connectors. To this end, the unit comprises alternate slitting and insertion blades 169' and 170' formed on respective blade parts 169 and 170. The slitting blades 169', which are sharp edged, are received each between an adjacent pair of insertion blades 170' and the slitting blade part 169 is slidable relative to the insertion blade part 170, the slitting blade part 169 being guided for sliding movement between a back plate 171 and the insertion blade part which is located with respect to, and fixed to, the back plate, there being a spacer 172 located and fixed therebetween having bores housing compression springs 173 urging the slitting blade part to project its blades' cutting edges 169'' beyond the insertion edges 170'' of the insertion blades 170'. A flange 169a on the slitting blade part engages a stop (not shown) when the termination press P carrying the unit 168 is operated to limit the downward movement of the slitting blade part 169 whereby slitting of the ribbon cable webs is accomplished against the underlying connector stick housings without damage to the housing at the termination station being operated. The configuration of the insertion edges 170'', which are radiused in cross-section to receive the insulation covered wires, is chosen to suit the form of the connector housings and insulation displacement terminals of the connector sticks as will be well understood, in all so as to insert the wires fully into the insulation displacement terminals and between strain relieving gripping formations of the housings.

Figure 14:
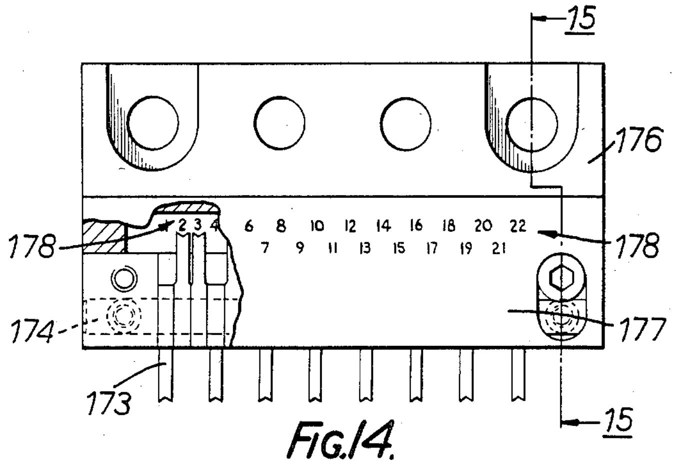
FIG. 14 is a front elevation with part broken away of the stick separation blade unit of the apparatus.
Figure 15:
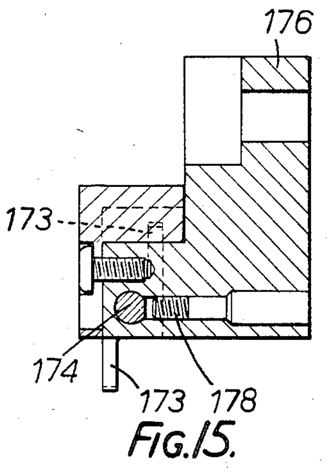
FIG. 15 is a cross-section on line 15—15 in FIG. 14.
Figure 16:
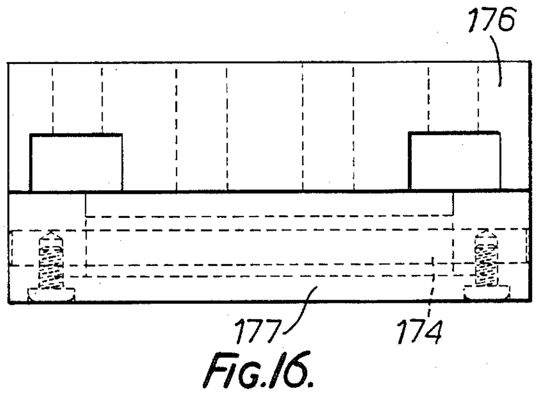
FIG. 16 is a top plan view in FIG. 14.
Figure 17:
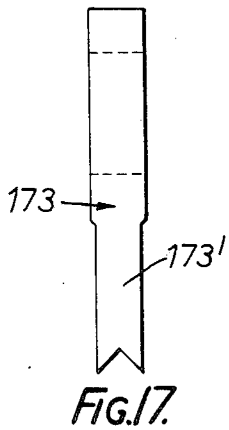
FIGS. 17 and 18 are front and side views respectively of one of the stick separation blades.

The stick separation blade unit 172 shown in FIGS. 14, 15 and 16 is intended for use at a component separation station U (see FIG. 4) of the apparatus for severing stick connectors into separate connector components at circuit points left void in the connector sticks. It may, however, alternatively be employed as an insertion blade unit for inserting discrete wires at an insertion station of the apparatus, e.g. to apply wires into I.D.T. connectors in multples or, again, for pre-loading series of connectors with voids between certain groups of connectors into the apparatus and, in conjunction with the actuator 114, for unloading such series from the unloading station of the apparatus.

Figure 18:
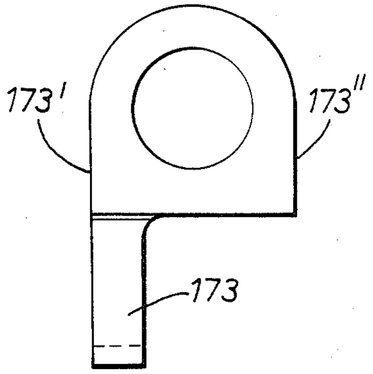

The unit 172 is made up of twenty two punches 173 rotatably mounted on a hinge pin 174 fixed in a base 176 to enable selected ones of the punches to be swung between an operative position shown in full line in FIGS. 14 and 15 and an inoperative or retracted position shown in dotted lines in FIG. 15. To allow for such selection of the punches, the unit has a removable cover 177 which, when in position, engages with one or other (see FIG. 18) of the edges 173' or 173'' of the punches to retain the punches, the unit has a removable cover 177 which, when in position, engages with one or other (see FIG. 18) of the edges 173' or 173'' of the punches to retain the punches in their selected operative or inoperative positions. Set screws 178 are employed to retain the hinge pin 174 in position and to fix the pin against rotation in the base 176. The punches are positively positioned at their edges 173' and 173'' between the cover 177 and the base. Conveniently, the punches are numbered, as at 178, both on the cover and again on the base behind the cover to enable the unit to be programmed for setting up the apparatus with selected punches as required. The punches are formed with V-form cutting edges and may be used to crop and separate connectors or connector sticks joined into chains by pin and hole coupling formations as described in commonly owned Patent Application Ser. No. 644,291 filed Aug. 27, 1984.

Figure 19:
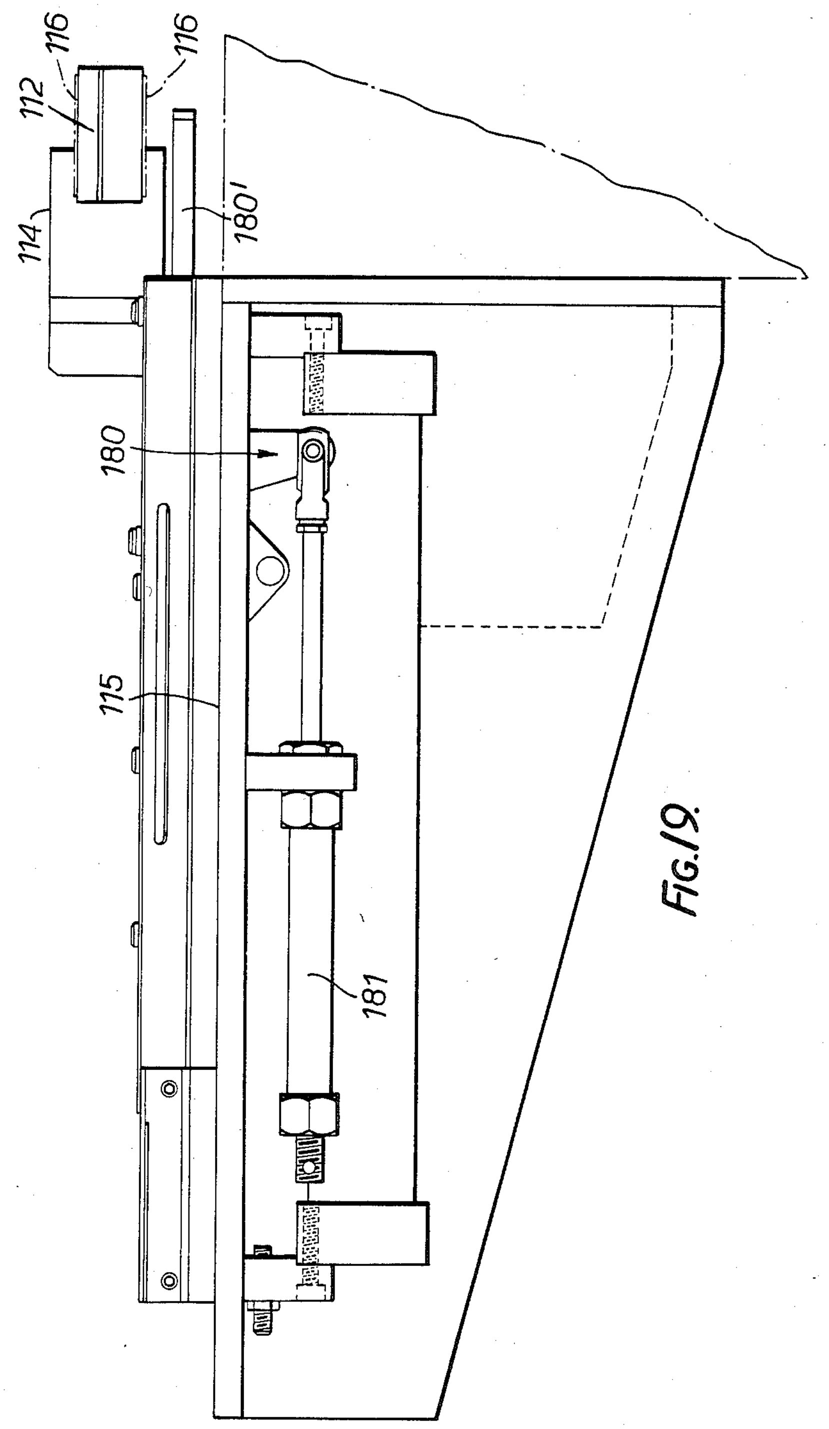
FIGS. 19 and 20 are side and underneath plan views of part of the apparatus respectively.
Figure 20:
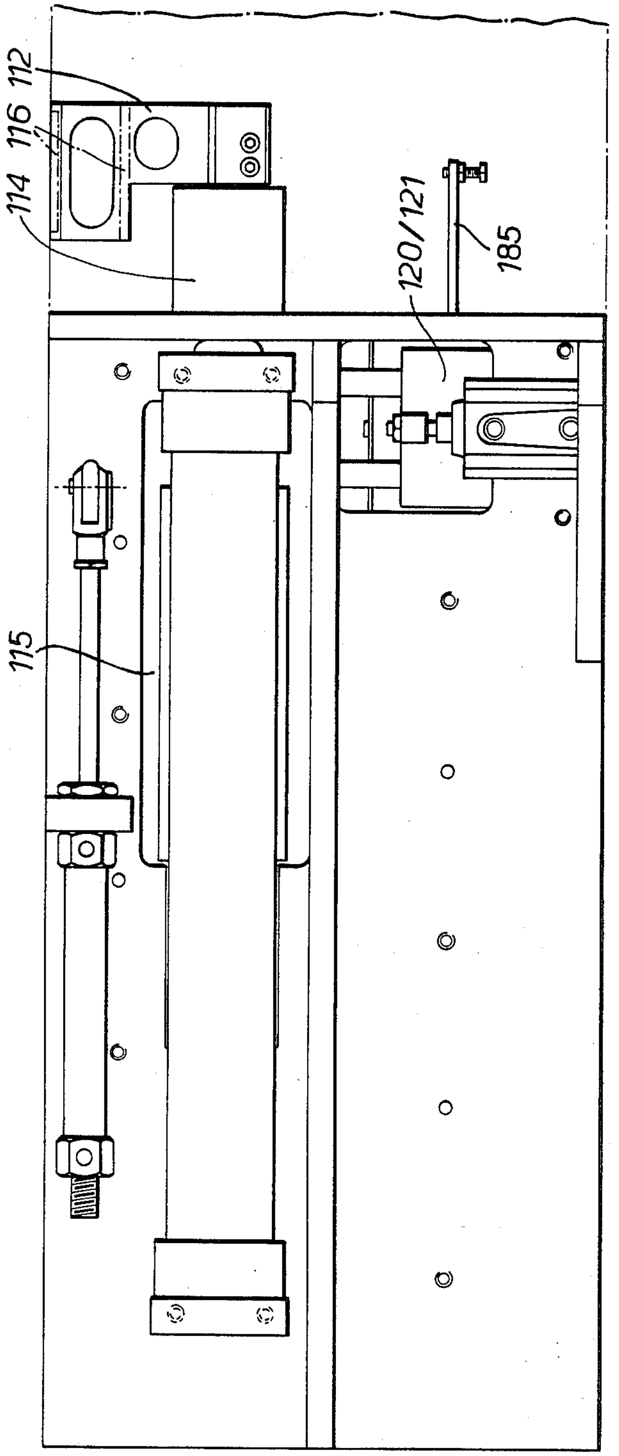

FIGS. 19 and 20 show a further linearly movable component unload release slide 180 of which one is associated with each shuttle table system 104, **104*a***.

The slide 180 like the slide 112 is operated by a pneumatic cylinder 181 and is mounted to slide in the direction of arrows E and G as indicated by the double-headed arrow D in FIG. 4, and in the direction D+ to engage its finger 180' with the roller follower 167' of the fixture 110 located at the unloading station g or g2 of the shuttle table system to displace its slide 163 by camming action against the action of the springs 165 and thereby release a component held in the fixture for unloading from the fixture. When the slide 180 is moved in the direction D− the finger 180' disengages the roller follower 167' and the fixture track is returned to its closed condition by its springs 165.

The pre-position shuttle component load actuator 120 likewise has a finger 185 to engage and force back the slide of the fixture 110 at the loading station f to open the track of the fixture to allow a component or components to be loaded into the track by the actuator 114.

In the initial setting of the apparatus the pre-position shuttle and component load actuator 120 is displaced to its A− position (see FIG. 4), the actuator 114 is in its C− position with its flap 112 in the B− position and the component unload release slide is in its D− position. The apparatus is operated to load and unload the apparatus and to shift the shuttle tables 106 on both sides of the apparatus in the following tabulated, automatically controlled, sequence of steps:

| Load/unload | Shuttle | |
|---|---|---|
| A+ | G | |
| B+ | H | |
| C+ | | Component separation (C+, A−, B−, D+) |
| A− | | |
| B− | | |
| D+ | E | |
| C− | | Wire insertion (C−, D−) |
| D− | | |
| | F | |

In the above table the letters in the "Shuttle" column indicate the shuttle table movement, as indicated by the arrows E to G, which occurs at the same time as the load/unload movement, indicated by the arrows A to D, on the same line of the table. Such movements are sequenced by a common command signal.

The apparatus includes an electronic control system of any known or convenient construction programmed to sequence the operation of the apparatus. The stepper motors 140 are sequenced by the system to achieve simultaneous movements of the shuttle tables of the systems 104, **104*a***.

As will be well understood, the various fixtures described may readily be changed to suit the style of the connectors being processed.

We claim:

1. An apparatus for making an electrical cable harness including a flat multiconductor ribbon cable with a plurality of spaced-apart electrical conductors having a common insulating covering forming web portions between adjacent conductors, electrically connected to an electrical connector having a plurality of insulation displacing terminals mounted in a dielectric housing, the apparatus including a connector loading station whereat a connector is initially positioned, a termination station spaced from said loading station whereat a connector is terminated to said cable, means for moving said connector from said loading station to said termination station, said connector moving means comprising a shuttle table system including a plurality of coplanar tables movable in a common closed rectilinear path between said connector loading and terminating stations, at least one table having connector carrying means thereon, means for presenting a cable end to said termination station so that the conductors are aligned with said terminals, and a termination head at said termination station for engaging the end of the cable and mass inserting said conductors in said terminals, the improvement comprising:

a feed member movable between a feed track and said loading station, said feed member having a plurality of engaging means for interengaging complementarily shaped engaging means formed on an outside surface of said housing to align said housing with respect to said feed member; and means for moving said feed member to said loading station to thereby deliver said connector to a predetermined initial position at said loading station.

2. The apparatus of claim 1 wherein said connector carrying means comprises an elongated, slotted track-like fixture attached to said one table.

3. The apparatus of claim 2 wherein said feed member includes a track-like portion, aligned with a table fixture at said loading station to form therewith a continuous path of connector travel.

4. The apparatus of claim 3 wherein said feed member comprises a plate having an edge carrying said complementary engaging means, mounted for reciprocation between said feed track and a table fixture located at said loading station.

5. The apparatus of claim 4 wherein said plate is mounted for rotation between said loading station and an eject station located adjacent thereto.

6. The apparatus of claim 5 further comprising an eject track aligned with a table fixture at said eject station to form therewith a continuous path of connector travel.

7. The apparatus of claim 6 wherein said plate, when rotated toward said eject station, is operable to engage a connector located in a table fixture thereat, with subsequent reciprocation of said plate advancing said connector along said eject track.

8. An apparatus for making a double-ended electrical cable harness including a flat multi-conductor ribbon cable having two ends, each terminated to an electrical connector having a plurality of insulation displacing terminals, the apparatus including a connector loading station whereat a connector is initially positioned, a pair of spaced-apart termination stations, remote from said loading station, whereat a connector is terminated to said cable, means for moving a connector from said loading station to each of said termination stations, said connector moving means comprises a shuttle table system including a plurality of coplanar tables movable in a common closed rectilinear path between said connector loading and termination stations, at least one table having connector carrying means thereon, means for presenting the respective ends of a predetermined length of cable to said termination stations, including means for feeding a predetermined length of cable from a cable supply, means for severing said predetermined length from said cable supply, and means for presenting respective ends of said cable length to each of said termination stations, the improvement in said cable presenting means comprising:

a pair of presenting wire guides movable from initial positions to extended positions between said termination stations, a carriage wire guide located at an initial position beside said pair of presenting wire guides, operative to engage a free end of a cable from said cable supply and to travel from said initial position past said first presenting wire guide to a point between said presenting wire guides, to thereby feed said cable free end through said second presenting wire guide for gripping engagement therewith, a termination head mounted for reciprocal movement at the termination station for engaging a cable end and mass inserting said conductors in said terminals, cable cutting means disposed between said carriage wire guide and said first presenting wire guide, operative to sever said cable from said cable supply to define said predetermined length, and actuating means for moving said presenting wire guides to said extended positions to simultaneously present free ends of said cable length to said termination stations, whereby each end of said cable conductors are aligned with terminals of a connector, at a point adjacent said termination head.

9. The apparatus of claim 8 wherein said connector carrying means comprises an elongated, slotted track-like fixture attached to said one table.

10. An apparatus for making an electrical cable harness including a flat multi-conductor ribbon cable with a plurality of spaced-apart electrical conductors having a common insulating covering forming web portions between adjacent conductors, electrically connected to an electrical connector defined by a housing having a plurality of insulation displacing terminals loaded therein, the apparatus including a connector loading station whereat a set of connectors is initially positioned, a termination station spaced from said loading station whereat a connector is terminated to said cable, means for moving said connector from said loading station to said termination station, means for presenting a cable end to said termination station so that the conductors are aligned with said terminals, and a termination head at said termination station for engaging the end of the cable and mass inserting said conductors in said terminals, the improvement in said connector moving means comprising a shuttle table system including a plurality of coplanar tables movable in a common closed rectilinear path between said connector loading and terminating stations, at least one table having connector carrying means thereon.

11. The apparatus of claim 10 wherein said connector carrying means comprises an elongated, slotted track-like fixture attached to said one table.

12. The apparatus of claim 10 further comprising a connector eject station disposed on said path opposing said loading station, whereat a connector is loaded onto an eject track.

13. An apparatus for making an electrical cable harness including a flat multi-conductor ribbon cable with a plurality of spaced-apart electrical conductors having a common insulating covering forming web portions between adjacent conductors, electrically connected to an electrical connector defined by a housing having a plurality of insulation displacing terminals loaded therein, the apparatus including a connector loading station whereat a set of connectors is initially positioned, said set including a plurality of housings spaced predetermined distances from each other and joined together by connecting tabs, a termination station spaced from said loading station whereat a connector is terminated to said cable, means for moving said connector from said loading station to said termination station, means for presenting a cable end to said termination station so that the conductors are aligned with said terminals, a termination head at the termination station for engaging the end of the cable and mass inserting said conductors in said terminals, and tab removing means operatively associated with said tabs after conductor insertion for removing said connecting tabs so as to separate said set of connectors into a plurality of independent harnesses, the improvement in said tab removing means comprising:

a base member moveable toward said set of connectors;

a plurality of punches mounted on said base and aligned with said connecting tabs, selectively moveable between an operative position for contacting said tab portions, and a second inoperative retracted position; and a cover overlying said punches and engaging said base member, having means engaging said punches for maintaining first and second predetermined sets of punches in said operative and said inoperative positions, respectively.

14. Apparatus of claim 13 wherein said punches include a pivotal mounting and a pair of opposed locking surfaces, and said cover has a plurality of mating locking surfaces for engagement therewith as said cover engages said base, whereby said punches positioned in one operating position are prevented from pivoting to the other operating position.

* * * * *